US011558930B2

(12) United States Patent
Mafuve et al.

(10) Patent No.: US 11,558,930 B2
(45) Date of Patent: Jan. 17, 2023

(54) THERMAL CONTROL APPARATUS AND METHOD

(71) Applicant: Jemella Limited, Leeds (GB)

(72) Inventors: Innocent Mafuve, Leeds (GB); Marcos Fernandez, Leeds (GB); Timothy Moore, Leeds (GB)

(73) Assignee: Jemella Limited, Leeds (GB)

( * ) Notice: Subject to any disclaimer, the term of this patent is extended or adjusted under 35 U.S.C. 154(b) by 388 days.

(21) Appl. No.: 15/733,241

(22) PCT Filed: Dec. 18, 2018

(86) PCT No.: PCT/GB2018/053651
§ 371 (c)(1),
(2) Date: Jun. 15, 2020

(87) PCT Pub. No.: WO2019/122839
PCT Pub. Date: Jun. 27, 2019

(65) Prior Publication Data
US 2021/0093065 A1    Apr. 1, 2021

(30) Foreign Application Priority Data

Dec. 22, 2017 (GB) .................................. 1721844.7

(51) Int. Cl.
*A45D 1/04* (2006.01)
*A45D 1/28* (2006.01)
(Continued)

(52) U.S. Cl.
CPC ............. *H05B 1/02* (2013.01); *H05B 3/0019* (2013.01); *H05B 3/262* (2013.01); *A45D 1/06* (2013.01);
(Continued)

(58) Field of Classification Search
None
See application file for complete search history.

(56) References Cited

U.S. PATENT DOCUMENTS 5,354,967 A * 10/1994 Barzilai ............. G05D 23/1909
219/241
2009/0095726 A1    4/2009 Song et al.
(Continued)

FOREIGN PATENT DOCUMENTS

CN             2435771 Y       6/2001
CN          102052973 A        5/2011
(Continued)

OTHER PUBLICATIONS

"International Application Serial No. PCT/GB2018/053651, International Search Report dated Mar. 22, 2019", (Mar. 22, 2019), 4 pgs.
(Continued)

*Primary Examiner* — Joseph M. Pelham
(74) *Attorney, Agent, or Firm* — Schwegman Lundberg & Woessner, P.A.

(57) ABSTRACT

The present invention provides a heating apparatus for heating a load. The heating apparatus comprises a heater having a heating element for receiving electrical power and for converting the electrical power into heat to heat a heating surface of the heater. The heating apparatus also comprises a temperature sensor for sensing and outputting a measurement of the temperature of the heating element, a power actuator for providing the electrical power to the heating element of the heater, a power sensor for sensing and outputting a measurement of the power provided to the heating element by the power actuator, and control circuitry for controlling the power actuator to control the power delivered by the power actuator to the heating element. The control circuitry is configured to receive the temperature measurement from the temperature sensor, receive the
(Continued)

power measurement from the power sensor, combine the temperature measurement and the power measurement, and control the power actuator in dependence upon the combined temperature measurement and power measurement. This ensures that the temperature of the heating surface is constant throughout a period when the load is applied.

18 Claims, 7 Drawing Sheets

(51) Int. Cl.
    *A45D 2/00*     (2006.01)
    *H05B 1/02*     (2006.01)
    *H05B 3/26*     (2006.01)
    *H05B 3/00*     (2006.01)
    *A45D 1/06*     (2006.01)

(52) U.S. Cl.
    CPC .............. *A45D 1/28* (2013.01); *H05B 1/0252* (2013.01); *H05B 2213/07* (2013.01)

(56) References Cited

U.S. PATENT DOCUMENTS

| | | |
|---|---|---|
| 2012/0312320 A1 | 12/2012 | Humphreys et al. |
| 2013/0006427 A1 | 1/2013 | Hall et al. |
| 2015/0136169 A1 | 5/2015 | Moore et al. |
| 2015/0313339 A1* | 11/2015 | Moore ................... A45D 20/30 132/211 |
| 2016/0213117 A1 | 7/2016 | Keong |

FOREIGN PATENT DOCUMENTS

| | | | |
|---|---|---|---|
| CN | 103732098 A | 4/2014 | |
| CN | 104507355 A | 4/2015 | |
| CN | 205072308 U | 3/2016 | |
| CN | 105455380 A | 4/2016 | |
| CN | 105764376 A | 7/2016 | |
| CN | 107440293 A | 12/2017 | |
| EP | 2929798 A1 | 10/2015 | |
| GB | 2477834 A | 8/2011 | |
| KR | 20070116411 A | * 12/2007 | ............. G05D 23/19 |
| KR | 20160068491 A | 6/2016 | |
| WO | WO-2015071656 A1 | 5/2015 | |

OTHER PUBLICATIONS

"International Application Serial No. PCT/GB2018/053651, Written Opinion dated Mar. 22, 2019", (Mar. 22, 2019), 6 pgs.

"Chinese Application Serial No. 201880087251.4, Office Action dated Feb. 23, 2021", w/Concise Statement of Relevance, (Feb. 23, 2021), 11 pgs.

* cited by examiner

THERMAL CONTROL APPARATUS AND METHOD

PRIORITY APPLICATIONS

This application is a U.S. National Stage Filing under 35 U.S.C. 371 from International Application No. PCT/GB2018/053651, filed on Dec. 18, 2018, and published as WO2019/122839 on Jun. 27, 2019, which claims the benefit of priority to Great Britain Application No. 1721844.7, filed on Dec. 22, 2017; the benefit of priority of each of which is hereby claimed herein, and which applications and publication are hereby incorporated herein by reference in their entireties.

FIELD OF THE INVENTION

The present invention relates to an apparatus and method for controlling temperature in heating devices. The invention has particular although not exclusive relevance to an apparatus and method for controlling temperature in devices for manipulating the shape of hair, for example in order to style the hair.

BACKGROUND TO THE INVENTION

There are a variety of apparatus available for styling hair. One form of apparatus is known as a hair straightener which employs plates that are heatable. To style, hair is clamped between the plates and heated above its glass transition temperature where the hair becomes mouldable.

A hair straightener device usually comprises a pair of arms hinged at one end and each arm comprising one or more heaters. Each heater typically comprises a heating element, usually ceramic, and one or more heating plates, usually aluminium. Such a device enables hair to be sandwiched between the plates and heated from both sides. Hair has a relatively high thermal mass and when in contact with the heating plates the hair absorbs a significant amount of the heat energy from the heating plates. The heating elements must quickly supply the lost heat energy back to the heating plates otherwise the temperature of the heating plates will drop and potentially impact on the quality of the thermal styling. The thermal styling of hair relies on the glass transition phase (GTP) temperature of hair: to style hair, the hair must be heated to above the GTP where the shape of the hair can then be manipulated. When the hair cools back down, it will maintain that shape until it is "reset" with water. If the temperature of the heating plates drops such that the hair is not heated to above the GTP, then the styling is poor. Also, if the temperature goes too high then the hair can be permanently damaged, hence it is important in such hair styling devices to have accurate temperature control. The temperature of the heating plates should be as high as possible to enable fast styling and the hair heating up to the GTP as fast as possible, but not so hot that it causes damage to the hair when the hair styling device is moved slowly through the hair.

Typically, hair straighteners are powered using high voltages (for example 110Vac to 255Vac). This means the heating elements are powered by high voltages (above Safety Extra Low Voltage, SELV), and where the electronic circuitry is not isolated (for cost reasons), the temperature sensor is attached to the electrically insulating ceramic heating element. Hence the temperature measured by the electronics via the sensor is not the actual temperature of the surface of the heating plate (or the surface of the hair) rather it measures the temperature of the ceramic heating element. Due to the thermal resistance between the ceramic heating element and the heating plate (and due to the thermal resistance of the heating plate and the ceramic heating element themselves) there is a temperature drop across the ceramic-aluminium assembly which is proportional to the power provided by the heater, the proportionality constant being the thermal resistance.

The present invention seeks to provide a way of rapidly compensating for the temperature drop across a heater that is thermally connected to a heater when a thermal load is suddenly applied.

SUMMARY OF THE INVENTION

The idea behind the novel control system described herein is to try to ensure that the temperature of the heating surface is constant throughout the period when the load is applied. The invention can be applied to a wide variety of devices including hair straighteners or hair stylers, cooking appliances, heated mixing bowls, water heaters, coffee makers as well as other hair styling devices such as curling tongs, curling devices, eye lash curlers and hair dryers. The invention allows water to be heated in a fast and efficient manner, for example when used in coffee making devices, kettles and showers.

In a first aspect, the present invention provides heating apparatus for heating a load, the heating apparatus comprising: a heater having a heating element for receiving electrical power and for converting the electrical power into heat to heat a heating surface of the heater; a temperature sensor for sensing and outputting a measurement of the temperature ($T_D$) of the heating element; a power actuator for providing the electrical power to the heating element of the heater; a power sensor for sensing and outputting a measurement of the power provided to the heating element by the power actuator; and control circuitry for controlling the power actuator to control the power delivered by the power actuator to the heating element, wherein the control circuitry is configured to: receive the temperature measurement ($T_D$) from the temperature sensor; receive the power measurement (P) from the power sensor; combine the temperature measurement and the power measurement; and control the power actuator in dependence upon the combined temperature measurement and power measurement.

The control circuitry may be further configured to: determine a new output power ($P_{new}$) based on a target temperature ($T_D$) of the heating surface and a temperature differential ($\Delta T$) in the heater; wherein the temperature differential ($\Delta T$) is based on the received power measurement (P) and a thermal resistance ($R_{th}$) of the heater.

The temperature differential ($\Delta T$) in the heater may be calculated based on the received power measurement (P) multiplied by the thermal resistance ($R_{th}$) of the heater.

Determining a new output power ($P_{new}$) may include: determining a difference ($D_1$) between the received temperature measurement ($T_D$) and the target temperature ($T_D$) of the heating surface.

Determining a new output power ($P_{new}$) may further include: adding the temperature differential ($\Delta T$) in the heater to the determined difference ($D_1$) between the received temperature measurement ($T_C$) and the target temperature ($T_D$) of the heating surface.

The control circuitry may be further configured to determine the new output power ($P_{new}$) such that $T_C - T_D$ $P_{new} R_{th} = 0$.

The heater may further comprise an electrically-insulating interface between the heating element and the heating surface.

The heating surface may be metallic.

The heating apparatus may comprise a hair styler.

The hair styler may comprise first and second mutually-opposing arms adapted for movement between an open configuration for receiving a length of hair therebetween and a closed configuration in which hair is sandwiched between the opposing arms, and at least one of the arms may include the heater.

The control circuitry may be further configured to apply a weighting to the power measurement (P) before combining the temperature measurement and the weighted power measurement.

The weighting may be chosen so that the weighted power measurement represents a temperature drop between the temperature of the heating element and the temperature of the heating surface.

The control circuitry may be further configured to combine the temperature measurement and the power measurement such that the combined temperature measurement and power measurement represents a measure of the temperature of the heating surface.

The control circuitry may be further configured to compare the temperature of the heating surface with a desired temperature of the heating surface to generate an error signal and to control the power actuator to reduce the error signal.

The control circuitry may be further configured to filter the temperature measurement in order to reduce noise and/or configured to filter the power measurement to reduce noise.

In another aspect, the present invention provides a method of controlling a heater, the heater comprising a heating element for receiving electrical power from a power actuator and for converting the electrical power into heat to heat a heating surface of the heater, said method comprising: receiving a temperature measurement ($T_D$) of the heating element; receiving a power measurement (P) of the electrical power provided to the heating element; combining the temperature measurement and the power measurement; and controlling the power actuator in dependence upon the combined temperature measurement and power measurement.

In another aspect, the present invention provides a hair styler comprising: a heater for heating hair, the heater having a heating element for receiving electrical power and for converting the electrical power into heat to heat a heating surface of the heater; a temperature sensor for sensing and outputting a measurement of the temperature ($T_C$) of the heating element; a power actuator for providing the electrical power to the heating element of the heater; a power sensor for sensing and outputting a measurement of the power provided to the heating element by the power actuator; and control circuitry for controlling the power actuator to control the power delivered by the power actuator to the heating element, wherein the control circuitry is configured to: receive the temperature measurement ($T_C$) from the temperature sensor; receive the power measurement (P) from the power sensor; combine the temperature measurement and the power measurement; and control the power actuator in dependence upon the combined temperature measurement and power measurement.

BRIEF DESCRIPTION OF THE DRAWINGS

Embodiments of the invention will now be described, by way of example only, and with reference to the drawings in which.

In the Figures, like elements are indicated by like reference numerals throughout.

DETAILED DESCRIPTION OF PREFERRED EMBODIMENTS

The present embodiments represent the best ways known to the applicants of putting the invention into practice. However, they are not the only ways in which this can be achieved.

Overview of Hair Styler

Figure 1:
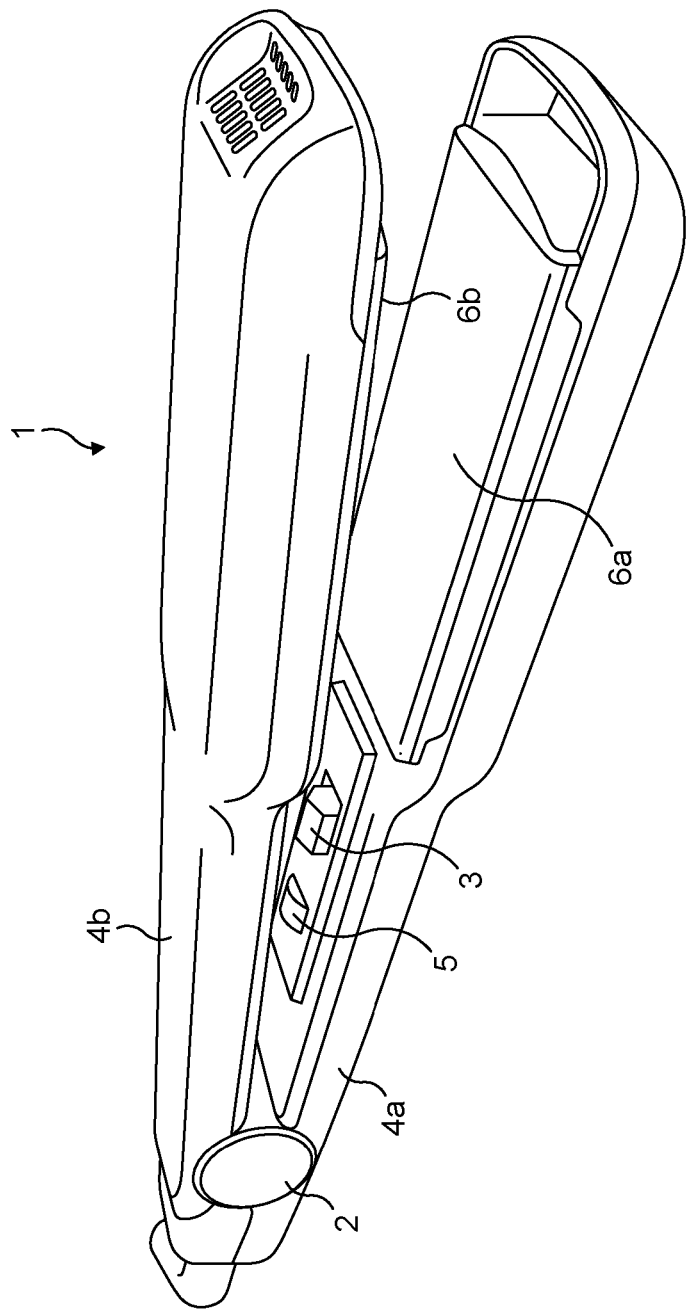
FIG. 1 illustrates a hair styler.

FIG. 1 illustrates a hair styler 1 which employs a thermal control system. The hair styler 1 includes a first movable arm 4a and a second movable arm 4b, which are coupled together by a hinge mechanism 2. The first and second movable arms 4a, 4b oppose one another and are movable relative to one other by virtue of the hinge mechanism 2. Thus, the first and second arms 4a, 4b can be brought together, into a closed configuration, or moved apart, into an open configuration, by a user during use.

The first arm 4a bears a first heating plate 6a, and the second arm 4b bears a second heating plate 6b. The first and second heating plates 6a, 6b oppose one another and, in use, are brought together as the first and second arms 4a, 4b are brought together, or separated as the first and second arms 4a, 4b are moved apart. The heating plates 6a, 6b form part of respective heaters.

The hinge mechanism 2 can incorporate any suitable means for allowing the first and second arms 4a, 4b to be moved relative to one other.

The hinge mechanism 2 may be configured to bias the first and second arms 4a, 4b into the open configuration, such that the user is required to apply pressure to the arms 4a, 4b to close them together, and such that the arms 4a, 4b automatically open once the pressure is removed. For example, the hinge mechanism 2 may incorporate a leaf spring or a coiled spring to provide this bias. Alternatively or additionally, the first and second arms 4a, 4b may be formed in a unitary manner (e.g. from a plastics material) with a "U" shaped middle part provided between the first and second arms 4a, 4b, the "U" shaped middle part being able to resiliently flex to allow opening and closing of the first and second arms 4a, 4b.

The electrical and electronic circuitry of the hair styler 1 is housed in the first arm 4a, with a switch 3 being provided on the first arm 4a to enable the styler 1 to be turned on or off, together with a light 5 to indicate whether the power is on. The electrical and electronic circuitry of the hair styler 1 could also be housed in the second arm 4b, or split between arms 4a and 4b. A sound can also be played by a sound generator (not illustrated) when the styler 1 is switched on and ready to use. Together, the switch 3, light 5 and sound generator (if included) form a user interface. In alternative embodiments the user interface may include additional components (such as, for example, a display means, to provide the user with more information on the operational status of the styler).

In use, hair is clamped between the two heating plates 6a, 6b and then the styler is moved such that the hair is pulled through the styler between the first and second heating plates 6a, 6b. Heat passes from hair contacting surfaces of the heating plates 6 into the hair to allow the styling of the user's hair using the device.

Heater

Figure 2:
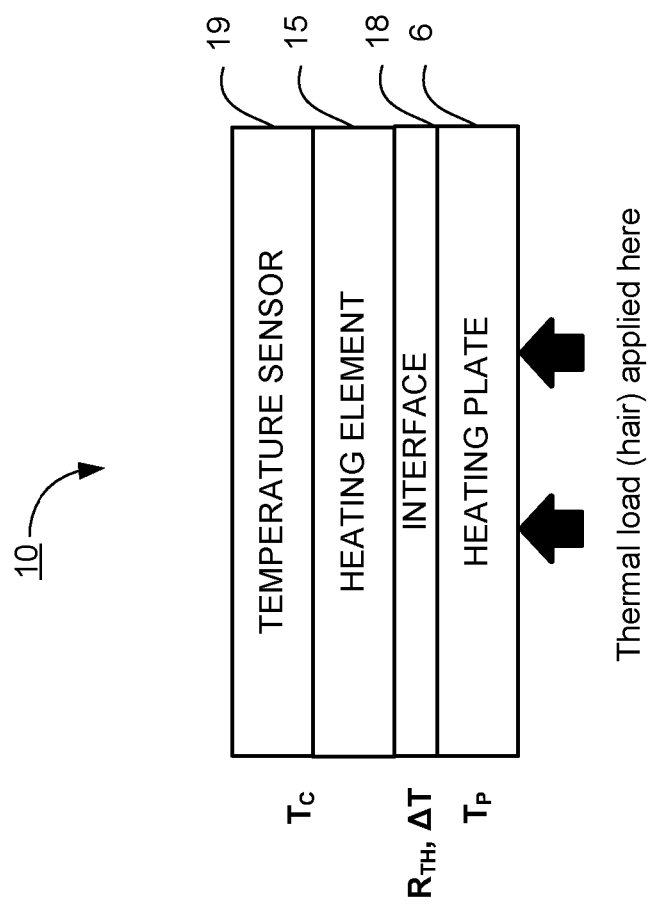
FIG. 2 is a cross-sectional view through a heater.

FIG. 2 is a cross-sectional view through the heater 10 (across the width of the arm 4) that shows the main components of the heater 10 (also referred to as a heater stack or a thermal stack) carried on each arm 4. As shown, the heater 10 includes a heating element 15 and a heating plate 6 which are thermally connected via an interface 18.

Typically, the heating element 15 is formed from a ceramic material and the heating plate 6 is formed from aluminium.

The interface 18 typically comprises a thermal paste which is thermally conducting, for example aluminium oxide paste.

The interface 18 may additionally or alternatively comprise a thermal barrier. This may comprise a layer of tightly sintered ceramic and/or a layer of a thermally stable plastic, such as Kapton tape. Typically, such a barrier will be present in the heater 10 in order to provide electrical insulation for improved safety, or to conform to standards or regulations. As a specific example, some territories have regulations which require electrical products such as hair stylers to include a layer of Kapton tape between electrical heating means and external surfaces for safety purposes (e.g. to reduce the risk of the user receiving an electrical shock). Most electrical insulators are excellent thermal insulators and hence have very high thermal resistances.

The heater 10 also includes a temperature sensor 19 (such as a thermistor) which is disposed on the heating element 15, on an opposing side to the heating plate 6.

FIG. 2 also illustrates some parameters of the heater including: $T_p$ which is the temperature of the heating plate 6; $T_c$ which is the temperature of the heating element 15 as measured by the temperature sensor 19; $\Delta T$ which is the temperature drop between the heating element 15 and the heating plate 6; and $R_{th}$ which is the thermal resistance between the heating element 15 and the heating plate 6. Preferably, $R_{th}$ takes into consideration the thermal resistance of the heating plate 6 and the thermal resistance of the heating element 15. $\Delta T$ is thus the temperature difference across this thermal resistance.

Using standard laws of physics, the plate temperature can be calculated as:

$$T_P = T_C - \Delta T \quad \text{Equation 1}$$

$\Delta T$ is related to the thermal resistance and thermal power, $P_I$, crossing the thermal interface 18, so $T_P$ can be written as:

$$T_P = T_C - R_{th} P_I \quad \text{Equation 2}$$

Accordingly, if the power $P_I$ crossing the interface 18 and the thermal resistance $R_{th}$ of the interface 18 are measured (or known), then the temperature $T_P$ of the heating plate 6 can be determined.

In Equation 2, power $P_I$ is a thermal power—i.e. Q/t where Q is the thermal energy in joules and t is time. The thermal energy Q originates from the heating element 15, which coverts electrical energy into heat energy. As described below, the heating element 15 is supplied with an electrical power P. The inventors identified that the losses in the system in converting the electrical power into thermal power are small and generally constant, and therefore measurement of the electrical power P supplied to the heating element 15 can be used to infer the thermal power $P_I$ dispersed across the interface 18. This can be done, for example, by applying a suitable weighting factor to electrical power P in order to take into account system losses, or by incorporating the weighting factor into the thermal resistance $R_{th}$ of the interface 18. Typically, the weighting factor is a constant multiplicative factor.

In prior art systems, feedback control loops act in such a manner that the heating element's temperature is kept as constant as possible, by turning on and off the heater through a power actuator. In other words, the control loop acts to ensure $T_C$ and the desired plate temperature or target temperature, $T_d$, are as close as possible. This means that $T_P$ will always be less than $T_C$ due to Equation 2: $P_I$ and $R_{th}$ are always positive, hence the temperature might not be high enough to style.

Also, it is desirable to have the heating plate 6 (which contacts the hair) to remain at a constant desired (target) temperature. This could be achieved by placing a sensor in the heating plate 6 or very near to the surface of the heating plate 6 which makes contact with the hair. However, this is expensive and on high voltage systems very difficult, because there needs to be an isolation clearance distance between the conductive parts which can be touched by the user and the electric circuit. Using electrically insulating material is possible, but usually such material is an excellent thermal insulator and hence you have the same problem described above.

As will be described in more detail below, the control electronics 24 use knowledge of the styling device to determine $T_P$ based upon fluctuations of $T_C$ and P and then adjusts P to ensure a constant $T_P$.

In the prior art, thermal resistances between a heating element and a heating plate can cause performance degradation during styling of hair because the time taken for the temperature sensor to recognise a temperature drop on the plate is long, therefore increasing the magnitude of the temperature drop. The present invention uses the fluctuations of $T_C$ and P to calculate a control signal, the control system is employing a type of feed forward control which advantageously ensures a constant $T_P$, even if a thermal barrier exists between the heating element 15 and heating plate 6 (e.g. $\Delta T$ is high), and even if a load is applied to the heating plate 6.

Thermal Control System

Figure 3:
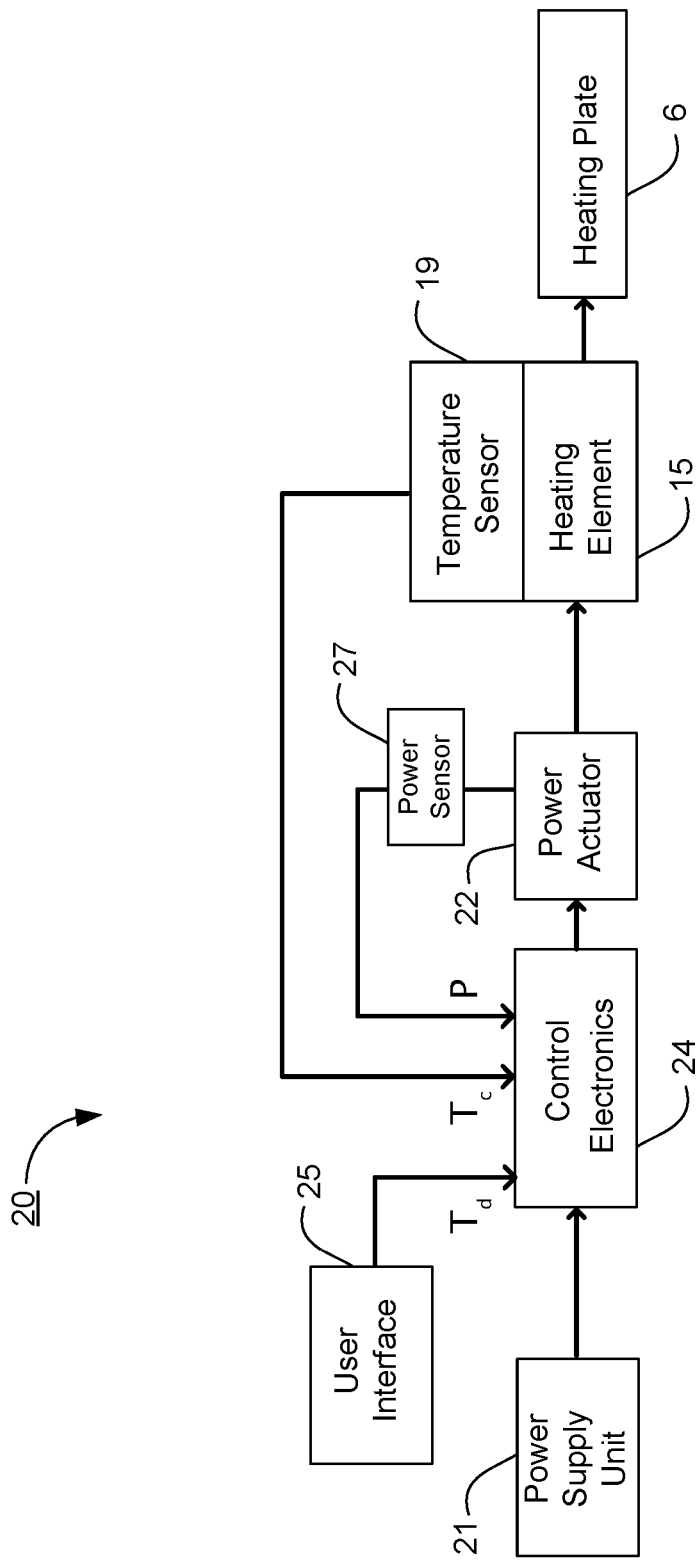
FIG. 3 is a schematic block diagram showing a thermal control system.

FIG. 3 is a schematic block diagram showing a thermal control system 20 used in the hair styler 1 of FIG. 1 to control the delivery of electrical power to a heater 10.

The thermal control system 20 includes a power supply unit 21, control electronics 24, a power actuator 22, a user interface 25, a power sensor 27, a heating element 15 and the temperature sensor 19. For completeness, FIG. 3 also shows the heating plate 6. The thermal control system 20 is configured to vary the electrical power supplied to the heating element 15 in order to maintain the heating plate 6 at a constant temperature $T_P$ when a thermal load (such as the user's hair) is applied to the heating plate 6.

The heating element 15 is thermally coupled to the temperature sensor 19, which provides measurement of the temperature $T_C$ of the heating element 15.

The power actuator 22 powers the heating element 15. The power actuator 22 could include a triac and/or any suitable means for controlling power output to the heating element 15.

The power sensor 27 measures the electrical power P output by the power actuator 22, and provides this measurement of power P to the control electronics 24. As stated above, since there are few losses in the system, the electrical power supplied to the heating element 18 can be equated to the thermal power $P_I$ crossing the interface 18 between the heating element 15 and the heating plate 6, and the weighting factor representing loss of energy in the system is included the thermal resistance $R_{th}$ of the interface 18. This is done during calibration of the system, as explained further below.

As described above with reference to equation 2, the temperature $T_P$ of the heating plate can be determined from the temperature of the heating element 15 ($T_C$) and by measuring the power $P_I$ crossing the interface 18 between the heating element 15 and the heating plate 6 and the thermal resistance $R_{th}$ of the interface 18.

The control electronics 24 (which may include a PID (proportional, integral, derivative) controller) control the power actuator 22 based on both the measurement (TO of the temperature of the heating element 15 received from the temperature sensor 19 and the measurement (P) of the power output by the power actuator 22 received from the power sensor 27. These measurements are used by the control electronics 24 to control the power output by the power actuator 22 in order to try and reach a target temperature $T_d$ of the heating plate 6 defined by the user via the user interface 25. $T_d$ is also referred to as the set-point or control temperature and preferably has a value of about 185° C.

Although 185° C. is the preferred target temperature, for styling hair the target temperature can range from, for example, 30° C. to 230° C. This advantageously allows for a variety of styling options, including "wet to style" where the hair styler is applied to wet hair. In this case, the water content of the hair can be measured, for example by using a detector which compares the amount of radiant energy in two absorption bands in the spectrum of light emitted by an infra-red source and reflected by the hair. Based on this measurement, the target temperature can be adjusted accordingly to stop damage occurring. As described further below, other ranges of target temperature may be used for different applications, such as in electric showers.

As will be described in more detail below, the control electronics 24 are effectively configured to use the measured values of the heater temperature $T_C$ and electrical power P and pre-stored data relating to the thermal resistance of the interface 18 ($R_{th}$), to determine the actual value of $T_P$, and from this an error between the target value $T_d$ and actual value $T_P$. The control electronics 24 then uses this error to calculate and output a control signal that will cause the power actuator 22 to output an updated electrical power signal that is applied to the heating element 15 and that will reduce this error to zero.

The power actuator 22 can vary the power delivered to the heating element 15 either by varying the current and/or the voltage applied to the heating element 15. In a preferred embodiment, the control signal generated by the controller is a pulse width modulated (PWM) signal that switches the power actuator 22 on and off, and wherein the power is varied by varying the mark-space ratio of the PWM control signal.

The pre-stored data relating to the thermal resistance of the interface 18 ($R_{th}$), is stored in non-volatile memory (not illustrated) forming part of the control electronics 24. This is typically done when the styling device is first calibrated during production, where $R_{th}$ and the electrical resistance of the heater 10 are measured. In particular, this is achieved in production by using external apparatus to control the device via a serial communications link and set $T_C$ on the device to a known target value. Then both $T_C$ and $T_P$ and their respective rates of change are measured directly using the external apparatus. This data can then be used to calculate the actual values of heater electrical and thermal resistance. These values are then loaded into the non-volatile memory, e.g. via a communications link. At this point, the energy losses in the system can also be measured and accounted for, by incorporating a weighting factor into the thermal resistance $R_{th}$. Alternatively or additionally, the system losses can be accounted for in the control electronics 24 by applying a suitable weighting factor to the measured electrical power P.

$R_{th}$ is the thermal resistance of the load or plate to air—it is believed that this resistance is unlikely to change between the plate being loaded or unloaded (hair being present or not). This is obviously a simplified system and does not consider thermal masses. Practically and against standard thinking, the inventors have found that the thermal masses do not need to be considered.

The measurement signals generated by both the power sensor 27 and the temperature sensor 19 may be passed through electrical filters to reduce the impact of noise. Likewise, the signal produced by the power actuator 22 can also be filtered to reduce sudden changes in the electrical power applied to the heating element 15.

The power supply unit 21 provides power to the thermal control system 20. In this embodiment, the power supply unit 21 is connected the control electronics 24, which in turn provides power to the power actuator 22 which powers the heating element 15. It will be appreciated that different arrangements may be provided for powering the thermal control system 20, for example by connecting the power supply unit 21 directly to the power actuator 22.

The power supply unit preferably powers the thermal control system 20 using relatively high voltages (for example 110Vac to 255Vac). For example, the power supply unit 21 may supply mains voltage (230Vac) to the thermal control system 20.

Control Loop

Figure 4:
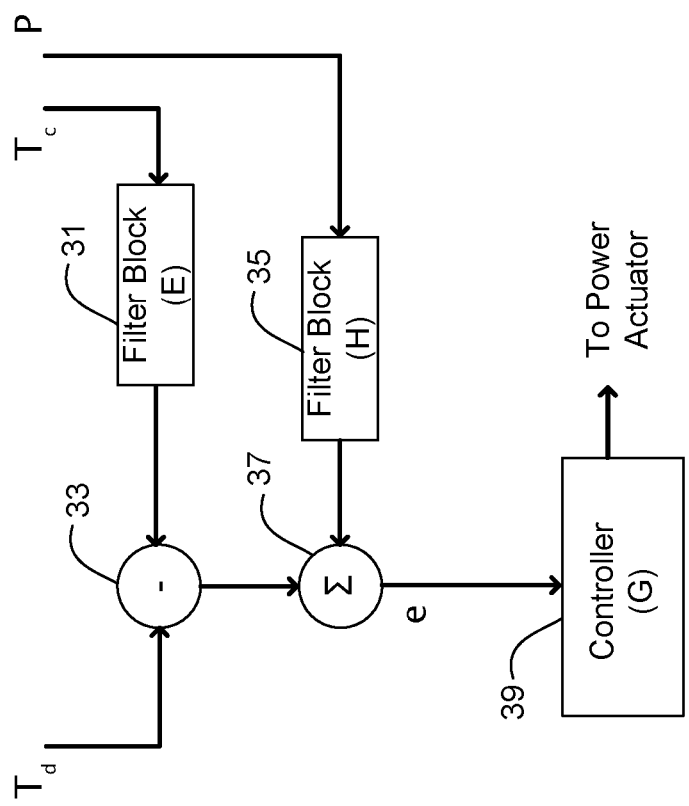
FIG. 4 is a schematic block diagram showing the main components of control electronics forming part of the system shown in FIG. 3.

FIG. 4 is a schematic block diagram illustrating the main components of the control electronics 24 forming part of the control system shown in FIG. 3. As shown, the temperature measurement $T_C$ is input to a filter block 31 that filters the temperature measurement (to reduce the effects of noise). The filter block 31 is represented by a transfer function (E). The filtered temperature measurement is then subtracted from the desired or set point temperature $T_d$ in the subtracting unit 33. Similarly, the power measurement (P) is filtered in filter block 35 to reduce the effects of noise. The filter block 35 is represented by a transfer function (H). The filter block 35 has a gain corresponding to $R_{th}$ (the thermal resistance between the heating element 15 and the heating plate 6—as determined for the styling device during the above described calibration routine). The weighted and filtered power measurement is then input to the adding unit 37 where it is added to the output from the subtracting unit 33. The output or error signal (e) from the adding unit 37 is then input to the controller 39 and is given by:

$$e = T_d - T_C + R_{th}P = T_d - (T_C - R_{th}P) = T_d - T_p \quad \text{Equation 3}$$

As $T_d$ is the desired temperature for the heating plate 15 and $T_p$ is the actual heating plate temperature, the error signal thus generated can be used by the controller 39 to control the power applied to the heating element 15 in order to drive this error signal to zero. The controller 39 can calculate an update to the output control signal as often as new measurements become available from the sensors. Alternatively, the filters may filter multiple measurements before outputting a filtered value for the controller 39. The inventors have found that the controller only needs to update the output control signal at a rate of about once every 0.1 to 0.5 seconds to achieve a steady control for the hair styler.

As discussed above, in the preferred embodiment, the control signal generated by the controller is a pulse width modulated (PWM) signal that switches the power actuator 22 on and off, and wherein the power is varied by varying the duty ratio of the PWM control signal. Care must also be taken to ensure that the controller 39 does not try to drive the heater with a power that is greater than the rated power of the heater (as defined by the heater manufacturer as $P_{max}$). The controller 39 does this by ensuring the duty ratio of the PWM control signal does not exceed a maximum value ($D_{max}$) calculated from:

$$D_{max} = \frac{P\max * R}{V^2} = \frac{P\max}{Pattainable}$$

Where V is the voltage received from the power supply unit, e.g. 230Vac and R is the electrical resistance of the heater.

Transfer Function Representation

Figure 5:
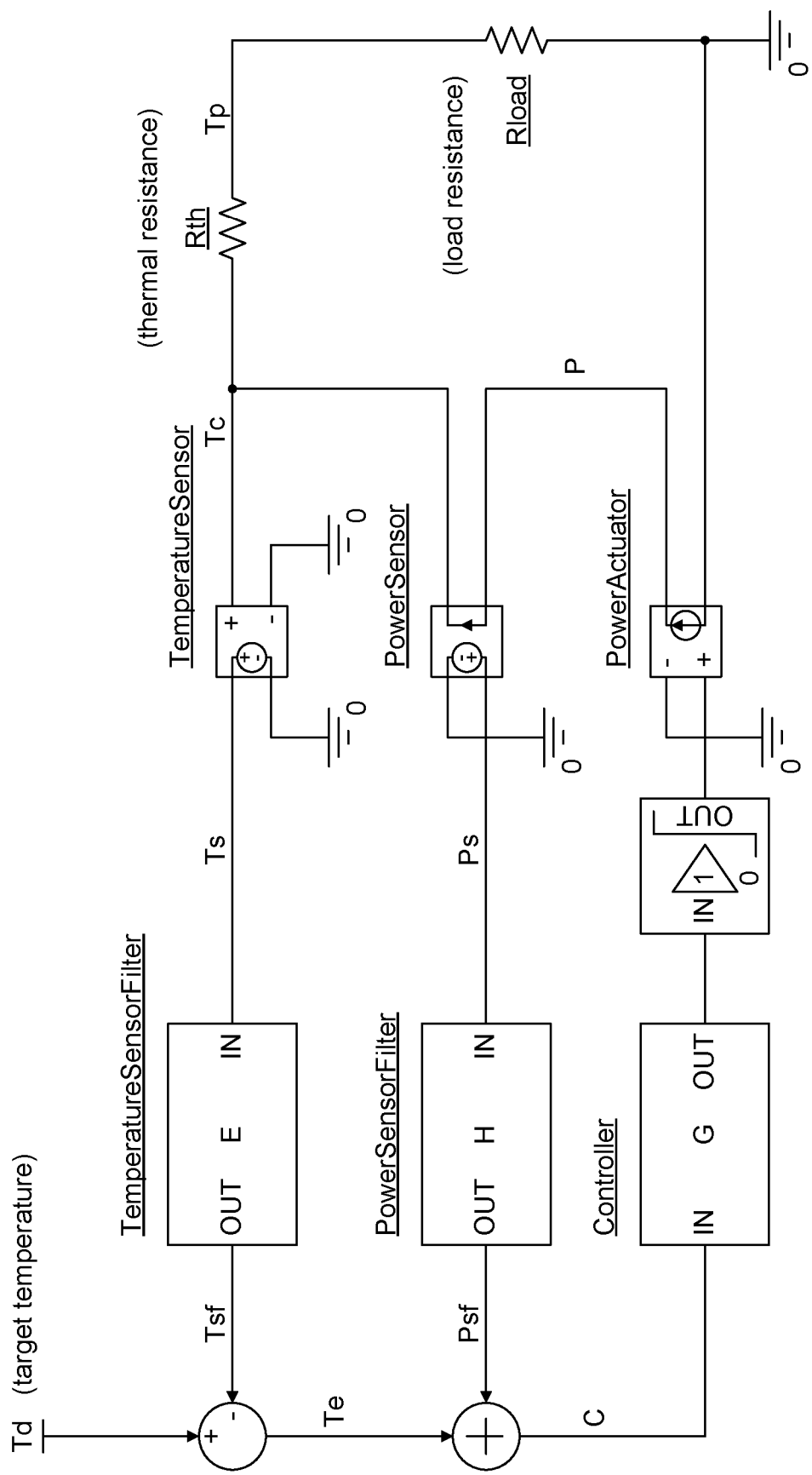
FIG. 5 is an equivalent electrical circuit of the control electronics.

FIG. 5 is an electrical equivalent circuit of the control loop, illustrating the temperature and power sensors, the filters and the controller as blocks having transfer functions. The load on the heater 10 is represented by the resistor $R_{load}$ and the thermal resistance between the heating element and the heating plate is represented by the resistor $R_{th}$.

The combined transfer functions of the temperature sensor and filter, the power sensor and filter, and the controller and power actuator are E, H and G respectively.

As shown in FIG. 5, temperature measurement $T_C$ is filtered to provide a filtered temperature measurement $T_{sf}$, where $T_{sf}=E*T_c$.

Power measurement P is filtered to provide a filtered power measurement $P_{sf}$, where $P_{sf}=H*P$.

Preferably, temperature is measured using tenths of a degree and power is measured using milliwatts.

The ratio of target temperature $T_d$ to plate temperature $T_P$ can therefore be given by:

$$\frac{Tp}{Td} = \frac{1}{\frac{1}{Rload}*\left(\frac{1}{G}-H\right)+E*\left(1+\frac{Rth}{Rload}\right)}$$

If the gain of the transfer function H is set as:

$$H = E * Rth$$

Then:

$$\frac{Tp}{Td} = \frac{1}{E} * \frac{1}{\frac{1}{G*Rload}+1}$$

In practice, in the case of a hair straightener where the plates are being pulled through hair, the relevant input (i.e. input excluding noise and undesirable signals) is constant or DC and hence the transfer functions can be defined by pure real gains (not complex), and $G*R_{load}$ is very large for all $R_{load}$ values of interest. This means:

$$\frac{Tp}{Td} \approx \frac{1}{E}$$

Hence, if the gain of the transfer function E is unity, then the steady state value of the plate temperature ($T_P$) is the target temperature ($T_d$), irrespective of the load. Thus using the feedback scheme in FIG. 5, the heater plate temperature ($T_P$) can be accurately tracked to the target temperature without the need for a sensor on the heater plate.

Normally the filters 31 and 35 are chosen to reduce noise (e.g. 50 Hz notch filter for the temperature sensor) or average the signals (e.g. low pass filter for the power sensor, since the nature of controlling AC power using semi-cycles is not very smooth).

The filter transfer functions can also be adjusted to change the dynamic response of the system and can include complex terms to change phase etc.

Consideration of the stability of the control system must also be made in the choice of filter transfer functions. As a safety precaution in our implementation, the stability was checked at runtime by ensuring that if the output of the controller 39 is zero, then the temperature should stop increasing within a predefined timeout.

Experimental Results

Figure 6:
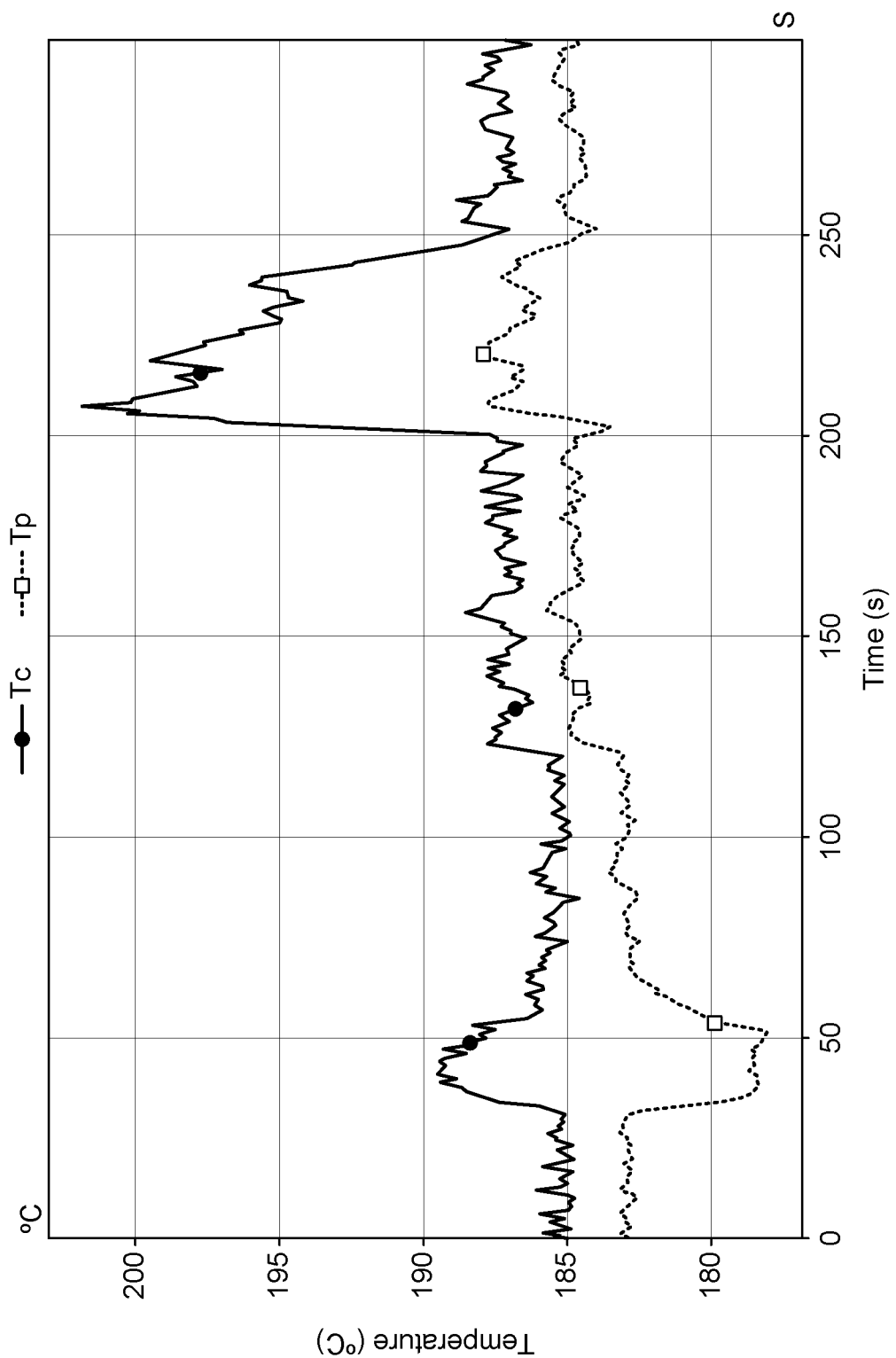
FIG. 6 is a plot showing experimental results obtained using an exemplary implementation.

FIG. 6 is a plot showing results obtained using an exemplary implementation. In this implementation, the heating plate temperature $T_p$ was measured directly.

In the exemplary implementation, the transfer functions are described as follows:

E is a 2nd order notch filter with unity gain except in the stopband (30-80 Hz).

G has a value 15, consisting of a PID controller (P=1.5, I=0, D=0) and a pure cascade gain of 10.

H is a 1st order low pass filter whose gain is set to Rth as measured during the calibration routine described above (typically 0.133 in our embodiment).

The design of the exemplary implementation is such that when the heating plates are idling (not heating hair) and the power actuator 22 is delivering 12 W to the heating plates 15, Rload computes to be 15 ohms, therefore G*Rload=225, its inverse 0.004, and thus Tp/Td=0.996. When the heating plates are loaded with hair and the power actuator 22 is delivering 30 W to the heating plates 15, Rload is 5 ohms, G*Rload=75, its inverse 0.013, and thus Tp/Td=0.987.

Because of the way the exemplary implementation was designed, controlling power delivery to the heaters every 320 msec, there is also a time delay. In reality, Rload is actually part of a complex impedance Zload consisting of Rload and Cload in parallel. In the steady or DC state the frequency dependent terms in all the transfer functions are zero, and we may consider the above transfer functions to be pure gains.

In FIG. 6 the y axis shows the temperature in degrees Celsius of the heating plate Tc and the temperature of the plate $T_P$ and the x axis shows the time in seconds. The results are summarised as follows.

0-119 sec-no control based on $T_C$ and P:

Between 0 and 30 sec the heating plates 15 were unloaded (no hair was present between the heating plates 15): It can be seen that $T_c$ is at the set-point temperature $T_d$=185° C.

However the plate temperature $T_p$ is at 183° C., 2° C. below the $T_c$. Power P was measured to be 20 W. A load (hair) was applied between the heating plates 15 at t=30 sec for a duration of 20 sec. As can be seen the plate temperature $T_p$ drops from 183° C. to 178° C. There is an apparent slight increase in $T_c$, but this is due to the localised nature of the load and the spot nature of the measurement thermocouple (the controller 39, because it uses an averaging sensor, sees no temperature change in $T_c$)

120-300 Sec-Control Based on $T_C$ and P

At t=120 sec, control based on $T_C$ and P was activated with the parameters 2° C. temperature drop and 20 W power. Immediately, the plate temperature $T_p$ went up to 185° C. (the same as the set-point temperature $T_d$), and $T_c$ went up to 187° C. At t=200 sec, the same load as before was applied for a duration of 40 sec. The marked rise in $T_c$ to over 200° C. is due to the above control action, and this results in the plate temperature staying almost the same (the rise of 2° C. can be removed by finer tuning of the compensation parameters). It can be seen that as the load temperature rises, the temperature $T_c$ begins to fall, which is consistent with less power being drawn. At time t=240 seconds the load was suddenly removed, and the system returned to its undisturbed state.

As can be seen from the above, by measuring the power applied to the heating element and using it to effectively determine a measure of the temperature drop between the heating element 15 and the heating plate 6, the controller 39 is able to quickly compensate for changes to the thermal loading applied to the heating plate 6. This allows for better and more accurate control of the heater plate 6.

Additional Heaters

The above description explains the control strategy for controlling the temperature of a single heater plate. As discussed above in the hair styler of FIG. 1, there are two heaters (heating elements and heating plates). Parallel control loops may be provided for controlling the two heaters independently. Alternatively, one controller may be provided to control the heating of both heaters—as illustrated in FIG. 7.

Figure 7:
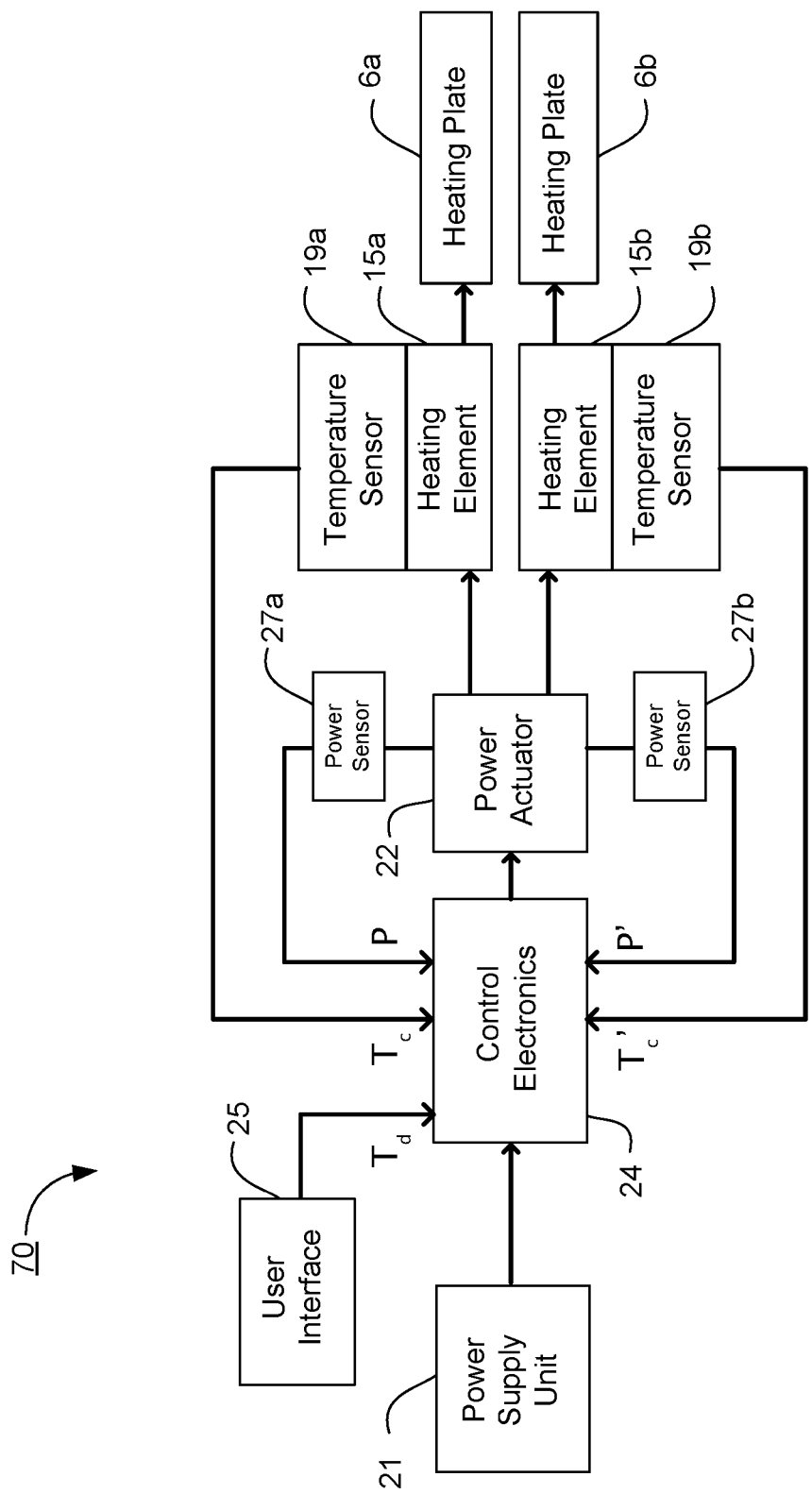
FIG. 7 is a schematic block diagram showing another thermal control system.

As shown in FIG. 7, a thermal control system 70 includes a power supply unit 21, control electronics 24, a power actuator 22 and a user interface 25. These elements are similar to the elements described above in FIG. 3, except that the control electronics 24 and power actuator 22 of thermal control system 70 are adapted to control the heating of two heaters. Heating element 15a, temperature sensor 19a, and heating plate 6a form part of a first heater, and heating element 15b, temperature sensor 19b, and heating plate 6b form part of a second heater.

A first power sensor 27a measures the electrical power P output by the power actuator 22 to the first heater, and provides this measurement of power P to the control electronics 24. A second power sensor 27b measures the electrical power P' output by the power actuator 22 to the second heater, and provides this measurement of power P' to the control electronics 24.

The thermal control system 70 is configured to vary the electrical power supplied to the heating elements 15a and 15b in order to maintain the heating plates 6a and 6b at a constant temperature $T_p$ when a thermal load (such as the user's hair) is applied to the heating plates 6a and 6b.

MODIFICATIONS AND ALTERNATIVES

An embodiment has been described above illustrating the way in which control electronics can determine the temperature of a heating surface (the surface of the heating plate) without using a temperature sensor on the plate—but by measuring the power drawn by the device as a load is applied to the heating surface and relating that to a temperature drop between the heating element whose temperature is being sensed and a thermal resistance between the heating element and the heating plate (determined during a calibration routine).

As those skilled in the art will appreciate, various modifications and alternatives can be made to the above described control system and some of these will now be described.

In the heater described above, the temperature sensor was attached to a side of the heating element that was opposite to the heating plate. In an alternative embodiment, the temperature sensor may be embedded within the heating element—so that the temperature sensor senses the temperature of the heating element at a position closer to the heating plate. Furthermore, the temperature sensor may not be part of the heater itself but may be attached to and/or placed in thermal contact with the heater, and preferably in contact with the heating element.

In the heater described above, a thermal interface was provided between the heating element and the heating plate. The thermal interface may comprise one or more of a thermal paste, a thermal barrier/insulator, an air gap, and an adhesive. This thermal interface may be omitted if desired— in which case the heating element will be in direct contact with the heating plate. However, the use of a thermal interface is preferred as it allows for a better thermal contact between the heating element and the heater plate which allows for better heat transfer between them.

In the above embodiments the power output by the power actuator 22 is measured using a power sensor. There are various ways of measuring the electrical power output by the power actuator 22 to the heater. For example, the voltage or current applied to the heater can be measured from which a power measure can be determined using the conventional $P=I^2R$ or $P=V^2/R$ equations.

In the case that the duty cycle of the voltage (or current) is being varied by the power actuator, the root mean squared (rms) voltage (or current) may be measured and multiplied by the duty cycle of the power actuator. Thus $V^2=Vrms^2\times$ duty.

The electrical resistance of the heater (R) depends on the temperature of the heater. The temperature/resistance curve is defined by the manufacturer and so the power measurement can be determined by using the sensed temperature to determine the heater resistance and multiplying this with the value of $V^2$ calculated above.

The control electronics can also be configured to control the maximum power output of the power actuator, in order to vary the amount of volume acquired by hair when being styled. Due to the dynamic response of hair, a high maximum power means that, when a tress of hair is applied to the heating plate, the hair will be heated quickly, which results in lower-volume, straight hair. On the other hand, a lower maximum power means that when a tress of hair is applied to the heating plate, the hair will be heated more slowly, which results in higher-volume hair.

It is noted that, for large thermal loads, reducing the maximum power will likely lower the rise in temperature of the load for the application period overall. However, for smaller thermal loads such as hair, the overall rise in temperature is approximately the same, while the rate of heating varies. It is the rate of heating which affects the hair volume.

In the above embodiment, the heater included a heating plate. As those skilled in the art will appreciate, the heating plate does not need to be in the shape of a plate. The purpose of the heating plate is to provide a heating surface from which heat can pass from the heating plate to the load to be heated—in the above case the hair to be heated. That heating surface can have any shape.

The values given in the transfer functions described above are exemplary. Those skilled in the art will appreciate that these values can be varied depending on the particular application, for example in devices other than hair stylers.

A new control system has been described for controlling the application of power to the heaters of a hair straightener. As those skilled in the art will appreciate, the techniques described above may be employed in a wide range of other hair styling and/or manipulation appliances including, but not limited to a hair crimping device, eyelash curlers, and a hair curler.

Furthermore, the techniques described above may be applied to many other devices employing thermal control, for example electric water showers, cooking devices and coffee making machines.

In the case of an electric shower, with a system which is thermally controlled in the standard manner, it can take a few minutes for the water to heat up to the desired temperature, and the water may not remain at the desired temperature in certain circumstances. For example, when the shower is turned off, the residual heat in the heating element can heat the water in the heating area to an undesirable temperature. If the shower is then suddenly turned back on again, this slug of water can easily scold the user.

Using the techniques described above, these problems can be at least partially addressed. By measuring the temperature of the heating element and the power being supplied to the heating element by a power actuator in the shower (e.g. the power consumption of the shower), the power actuator can be controlled to reduce the period of time taken for the water to reach the desired temperature. Also, by measuring heating element temperature and power input, the residual heat in the heater can be reduced, because the control of the temperature of the heater is more accurate. The control can also be made even more accurate by measuring water flow through the shower, as this indicates the load being applied to the heater.

For the electric shower, the control temperature is preferably in the range of 60° C. to 95° C.

In the case of a coffee making machine, it is important that the steam or hot water being applied to the ground beans is at a constant temperature and the correct temperature to ensure the correct organic chemicals from the beans end up in the coffee to ensure the correct bitterness and level of crema. In the past, this was traditionally achieved using a large copper block to store the heat energy to heat the water. This means such coffee making machines require a long time to warm up and be ready for operation, and the machines are heavy and inefficient. A cheaper and more convenient alternative is to use high power heating elements, but these must be accurately controlled to ensure the correct water or steam temperature.

Using the techniques described above, these problems in coffee making machines can be at least partially addressed. By measuring the temperature of the heating element and the power being supplied to the heating element by a power actuator in the coffee making machine (e.g. the power consumption of the coffee making machine), the water temperature can be accurately controlled. The control could be further improved by additionally measuring water flow and the ground bean temperature.

For the coffee making machine, the control temperature is preferably in the range of 80° C. to 120° C.

In the case of a heated mixing bowl or similar cooking device (examples of such product include Vorwerk Thermomix and Kenwood food mixer), it is important to ensure that the food being mixed is not over heated and is evenly heated to prevent lumpy sauces or burnt food. Using the techniques described above, by measuring the temperature of the heating element and the power being supplied to the heating element by a power actuator in the heated mixing bowl or similar cooking device (e.g. the power consumption of the device), the heat applied to the food can be accurately controlled. Similarly, this could apply to ovens and sous vide devices.

For the cooking devices, including heated mixing bowls and ovens, the control temperature is preferably in the range of 30° C. to 230° C.

No doubt many other effective alternatives will occur to the skilled person. It will be understood that the invention is not limited to the described embodiments and encompasses modifications apparent to those skilled in the art lying within the scope of the claims appended hereto.

Throughout the description and claims of this specification, the words "comprise" and "contain" and variations of the words, for example "comprising" and "containing", means "including but not limited to", and is not intended to (and does not) exclude other components, integers or steps.

The invention claimed is:

1. Heating apparatus for heating a load, the heating apparatus comprising:
   a heater having a heating element for receiving electrical power and for converting the electrical power into heat to heat a heating surface of the heater;
   a temperature sensor for sensing and outputting a measurement of the temperature ($T_C$) of the heating element;
   a power actuator for providing the electrical power to the heating element of the heater;
   a power sensor for sensing and outputting a measurement of the power provided to the heating element by the power actuator; and
   control circuitry for controlling the power actuator to control the power delivered by the power actuator to the heating element, wherein the control circuitry is configured to:
   receive the temperature measurement ($T_C$) from the temperature sensor;
   receive the power measurement (P) from the power sensor;
   combine the temperature measurement and the power measurement; and
   vary the power delivered to the heating element by the power actuator in dependence upon the combined temperature measurement and power measurement to drive the temperature of the heating surface to a desired operating temperature.

2. Heating apparatus according to claim 1, wherein the control circuitry is configured to determine a measure of the temperature of the heating surface by combining the temperature measurement and the power measurement and to control the power actuator in dependence upon the determined measure of the temperature of the heating surface.

3. Heating apparatus according to claim 1, wherein the control circuitry is further configured to:

determine a new output power ($P_{new}$) based on a target temperature ($T_D$) of the heating surface and a temperature differential ($\Delta T$) in the heater;

wherein the temperature differential ($\Delta T$) is based on the received power measurement (P) and a thermal resistance ($R_{th}$) of the heater.

4. Heating apparatus according to claim 3, wherein temperature differential ($\Delta T$) in the heater is calculated based on the received power measurement (P) multiplied by the thermal resistance ($R_{th}$) of the heater.

5. Heating apparatus according to claim 3, wherein determining a new output power ($P_{new}$) includes:

determining a difference ($D_1$) between the received temperature measurement (Tc) and the target temperature ($T_D$) of the heating surface.

6. Heating apparatus according to claim 5, wherein determining a new output power ($P_{new}$) further includes:

adding the temperature differential ($\Delta T$) in the heater to the determined difference ($D_1$) between the received temperature measurement ($T_C$) and the target temperature ($T_D$) of the heating surface.

7. Heating apparatus according to claim 1, wherein the control circuitry is further configured to determine the new output power ($P_{new}$) such that $T_C - T_D\, P_{new} R_{th} = 0$.

8. Heating apparatus according to claim 1, wherein the heater further comprises an interface between the heating element and the heating surface.

9. Heating apparatus according to claim 8, wherein the interface comprises at least one of an electrically-insulating interface and a thermally-insulating interface.

10. Heating apparatus according to claim 1, wherein the heating surface is metallic.

11. Heating apparatus according to claim 1, wherein the heating apparatus comprises a hair styler.

12. Heating apparatus according to claim 11, wherein the hair styler comprises first and second mutually-opposing arms adapted for movement between an open configuration for receiving a length of hair therebetween and a closed configuration in which hair is sandwiched between the opposing arms, and at least one of the arms includes the heater.

13. Heating apparatus according to claim 1, wherein the control circuitry is further configured to apply a weighting to the power measurement (P) before combining the temperature measurement and the weighted power measurement.

14. Heating apparatus according to claim 13, wherein the weighting is chosen so that the weighted power measurement represents a temperature drop between the temperature of the heating element and the temperature of the heating surface.

15. Heating apparatus according to claim 2, wherein the control circuitry is further configured to compare the temperature of the heating surface with a desired temperature of the heating surface to generate an error signal and to control the power actuator to reduce the error signal.

16. Heating apparatus according to claim 1, wherein the control circuitry is further configured to filter the temperature measurement in order to reduce noise and/or configured to filter the power measurement to reduce noise.

17. A method of controlling a heater, the heater comprising a heating element for receiving electrical power from a power actuator and for converting the electrical power into heat to heat a heating surface of the heater, said method comprising:

receiving a temperature measurement ($T_C$) of the heating element;

receiving a power measurement (P) of the electrical power provided to the heating element;

combining the temperature measurement and the power measurement; and controlling the power actuator in dependence upon the combined temperature measurement and power measurement, the controlling comprising varying the power delivered to the heating element by the power actuator in dependence upon the combined temperature measurement and power measurement to drive the temperature of the heating surface to a desired operating temperature.

18. A hair styler comprising:

a heater for heating hair, the heater having a heating element for receiving electrical power and for converting the electrical power into heat to heat a heating surface of the heater;

a temperature sensor for sensing and outputting a measurement of the temperature ($T_C$) of the heating element;

a power actuator for providing the electrical power to the heating element of the heater;

a power sensor for sensing and outputting a measurement of the power provided to the heating element by the power actuator; and control circuitry for controlling the power actuator to control the power delivered by the power actuator to the heating element, wherein the control circuitry is configured to:

receive the temperature measurement ($T_C$) from the temperature sensor;

receive the power measurement (P) from the power sensor;

combine the temperature measurement and the power measurement; and vary the power delivered to the heating element by the power actuator in dependence upon the combined temperature measurement and power measurement to drive the temperature of the heating surface to a desired operating temperature.

* * * * *

UNITED STATES PATENT AND TRADEMARK OFFICE
CERTIFICATE OF CORRECTION

PATENT NO. : 11,558,930 B2
APPLICATION NO. : 15/733241
DATED : January 17, 2023
INVENTOR(S) : Mafuve et al.

It is certified that error appears in the above-identified patent and that said Letters Patent is hereby corrected as shown below:

In the Specification

In Column 2, Line 34, delete "$(T_D)$" and insert --$(T_C)$-- therefor

In Column 2, Line 41, delete "$(T_D)$" and insert --$(T_C)$-- therefor

In Column 2, Line 58, delete "$(T_D)$" and insert --$(T_C)$-- therefor

In Column 2, Lines 66-67, delete "$T_C-T_D\ P_{new}R_{th}=0.$" and insert --$T_C-T_D-P_{new}R_{th}=0.$-- therefor In Column 3, Line 36, delete "$(T_D)$" and insert --$(T_C)$-- therefor In Column 7, Line 5, delete "18" and insert --15-- therefor In Column 7, Line 20, delete "(TO" and insert --$(T_C)$-- therefor In Column 8, Line 63, delete "15" and insert --6-- therefor In Column 10, Line 47, delete "15" and insert --6-- therefor In Column 10, Line 50, delete "15" and insert --6-- therefor In Column 10, Line 65, delete "15" and insert --6-- therefor In Column 10, Line 66, delete "15):" and insert --6):-- therefor In Column 11, Line 3, delete "15" and insert --6-- therefor In Column 11, Line 31, delete "heater" and insert --heating-- therefor Signed and Sealed this
Twenty-second Day of October, 2024

Katherine Kelly Vidal
*Director of the United States Patent and Trademark Office*

CERTIFICATE OF CORRECTION (continued)
U.S. Pat. No. 11,558,930 B2

In the Claims

In Column 15, Line 14, in Claim 5, delete "(Tc)" and insert --($T_C$)-- therefor In Column 15, Line 25, in Claim 7, delete "$T_C - T_D\ P_{new}R_{th}=0.$" and insert --$T_C - T_D - P_{new}\ R_{th} = 0.$-- therefor